United States Patent [19]

Clampitt et al.

[11] 4,170,586

[45] Oct. 9, 1979

[54] PLASTICIZED BUTENE-1 POLYMER COMPOSITIONS

[75] Inventors: Bert H. Clampitt, Katy; Donald E. Horstman, Houston, both of Tex.

[73] Assignee: Gulf Oil Corporation, Pittsburgh, Pa.

[21] Appl. No.: 941,839

[22] Filed: Sep. 11, 1978

[51] Int. Cl.$^2$ ................................................ C08K 5/01
[52] U.S. Cl. .......................... 260/33.6 PQ; 260/42.46
[58] Field of Search ..................... 260/33.6 PQ, 683.9, 260/683.15 B

[56] References Cited

U.S. PATENT DOCUMENTS

| 3,666,836 | 5/1972 | John | 260/33.6 PQ |
| 3,684,760 | 8/1972 | Goldbach et al. | 260/33.6 PQ |

*Primary Examiner*—Lewis T. Jacobs
*Attorney, Agent, or Firm*—Richard L. Kelly

[57] ABSTRACT

Crystalline polymers of butene-1 are plasticized with specific liquid hydrocarbons. The plasticizer is prepared by dimerizing an alpha olefin containing 8–12 carbon atoms and then hydrogenating the dimer.

5 Claims, 2 Drawing Figures

PLASTICIZED BUTENE-1 POLYMER COMPOSITIONS

BACKGROUND OF THE INVENTION

Crystalline butene-1 polymers are known in the art and have a desirable combination of physical properties. For certain applications, it would be desirable to be able to plasticize crystalline butene-1 polymers to modify the polymers' hand, hardness, and tensile properties. As is known, however, it is extremely difficult to plasticize crystalline polymers and no compatible plasticized butene-1 polymer compositions are reported in the art.

SUMMARY OF THE INVENTION

The invention comprises crystalline butene-1 polymer compositions which are plasticized by dispersing therein a specific type of hydrocarbon plasticizer which is a hydrogenated, highly branched, dimer of an alpha olefin containing about 8–12 carbon atoms and having a viscosity of about 1.8 centistokes at 210° F. (99° C.).

DETAILED DESCRIPTION OF THE INVENTION

Figure 1:
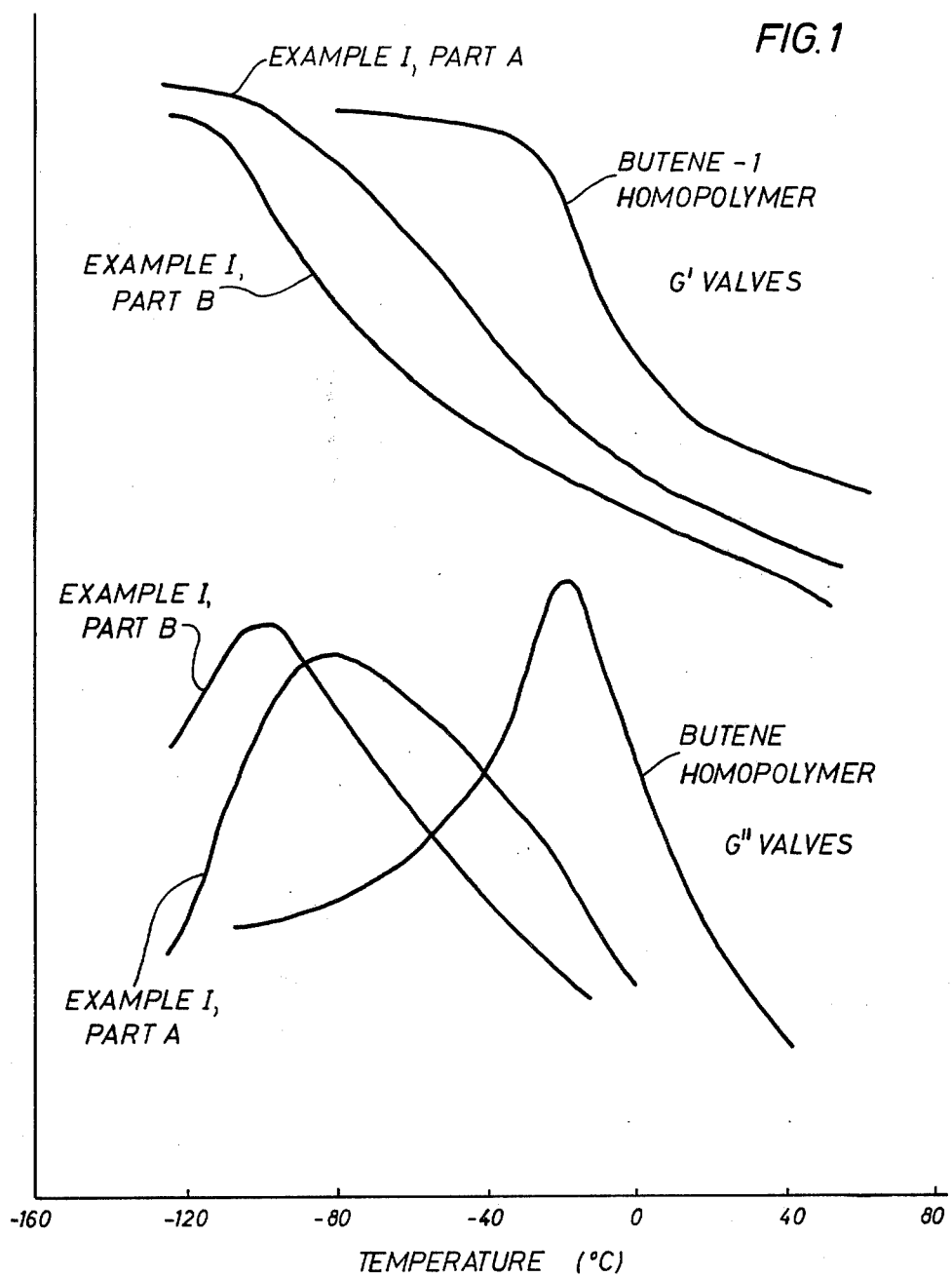
FIG. 1 is a plot of the dynamic moduli of a butene-1 homopolymer and two plasticized butene-1 homopolymer compositions containing, respectively, 20 to 30 weight % of a hydrocarbon plasticizer.

The crystalline butene-1 polymers employed in the invention are known compositions of commerce. Such polymers generally are prepared by polymerizing butene-1 in the presence of a Ziegler-type catalyst. The preferred butene-1 polymers for use in the invention are butene-1 homopolymers. Butene-1 copolymers containing at least 90 mol % of polymerized butene-1 also may be employed in the invention, provided that such copolymers are crystalline. Crystalline butene-1 copolymers can be prepared by copolymerizing the butene-1 with ethylene and lower alpha olefins such as propylene.

The hydrocarbon plasticizers employed in the invention are prepared by first dimerizing an alpha olefin containing 8–12 carbon atoms or a mixture of such alpha olefins. The dimer then is hydrogenated. The preparation of such hydrogenated dimers is described in U.S. Pat. No. 3,149,178, 3,382,291, 3,763,244, 3,780,128, and 4,032,591, which descriptions are incorporated herein by reference. As reported in U.S. Pat. No. 4,032,591, the alpha olefin can be oligomerized in the presence of boron trifluoride and a cocatalyst such as n-butanol. This reaction provides a mixture of the dimer, trimer, and higher polymers which can be separated by distillation. By appropriate control of reaction conditions, it is possible to prepare the desired dimer in high yields. The recovered dimer then is hydrogenated, preferably employing the hydrogenation technique reported in U.S. Pat. No. 4,032,591. The hydrogenation reaction causes isomerization of the dimer to provide 1 and 2 carbon atom branching.

The precise structure and composition of the hydrocarbon plasticizer will vary slightly, depending principally upon the specific alpha olefin or alpha olefin mixture oligomerized and the reaction conditions employed in the oligomerization reaction, and to a somewhat lesser extent upon the hydrogenation conditions employed. The dimer will contain 16–24 carbon atoms, have a viscosity at 100° F. (38° C.) in the range of about 4.0 to 6.5 centistokes, and have a pour point below about −80° F. (−62° C.). The physical properties of the product made from n-decene-1 by the process of U.S. Pat. No. 4,032,591 are:

| | |
|---|---|
| Viscosity, cs | |
| @ 210 F. | 1.8 |
| 100 F. | 5.3 |
| 32 F. | 19 |
| Pour Point, F. | −90 |
| Flash, COC, F. | 355 |
| Boiling Range | |
| @ 5 mm Hg, F. | 374–384 |
| MW | 282 |

The plasticized resin compositions of the invention are prepared by malaxating an appropriate mixture of the butene-1 polymer and the liquid hydrocarbon. Malaxation can be carried out by conventional methods as being compounded employing a rubber mill, a compounding extruder, a Banbury mixer, and a Brabender Plasticorder. If desired, additional components such as colorants, stabilizers, antioxidants and the like can be included in the plasticized compositions. The components of this type, when used, will be the same type of materials included in unplasticized butene-1 polymers.

The properties of the plasticized resin compositions will be somewhat dependent upon the quantity of the plasticizer dispersed in the butene-1 polymer. The inclusion of the plasticizer in the resin lowers the handle, the hardness, and the tensile properties of the resin composition. For most purposes, about 20–100 parts and preferably 25–50 parts by weight of hydrocarbon plasticizer will be dispersed in 100 parts by weight of the butene-1 polymer.

The following examples are set forth to illustrate more clearly the principle and practice of the invention to those skilled in the art. Where parts or percentages are referred to, they are parts or percentages by weight unless otherwise indicated.

EXAMPLE 1

Part A

A plasticized resin composition was prepared by blending 20 parts by weight of a hydrogenated dimer of n-decene-1* with 80 parts by weight of a butene-1 homopolymer sold under the designation Witco P.B. 1200. The polymer was added to a Brabender Plasticorder operated at 150° C., with a plasticizer being added thereto after the polymer had been melted. The plasticized polymer composition was cooled and granulated for further use in testing. 6 *The plasticizer's properties were those set forth earlier in the specification.

PART B

A second plasticized composition identical to that of Part A above was prepared except that 30 parts by weight of the hydrocarbon plasticizer were dispersed in 70 parts by weight of the butene-1 homopolymer.

Test specimens of the compositions of Example 1, Part A, and Example 1, Part B, were prepared for measurement of moduli in a mechanical spectrometer manufactured by Rheometrics, Inc. Both the storage modulus (G') and the shear loss modulus (G") were measured at several temperatures employing a frequency of 1 Hz. These data, together with the corresponding data on the unplasticized butene-1 homopolymer, are plotted in FIG. 1. The plotted data clearly show that the inclusion of the plasticizer lowers the glass transition temperature of the butene-1 homopolymer.

EXAMPLE 3

The handle, the harness, and the tensile properties of the composition of Example 1, Part B, and the butene-1 homopolymer contained therein, were measured and are set forth in Table I below.

Table I

| Property | Measured Values | |
|---|---|---|
| | Plasticized Resin | Butene-1 Homopolymer |
| Handle, gms | 6 | 22 |
| Hardness, Shore A | 89 | 95 |
| Hardness, Shore D | 28 | 58 |
| Tensile @ Break, psi | 1330 | 4820 |
| Tensile @ 100% elongation, psi | 1000 | 3250 |
| Elongation @ Break, % | 190 | 250 |

Figure 2:
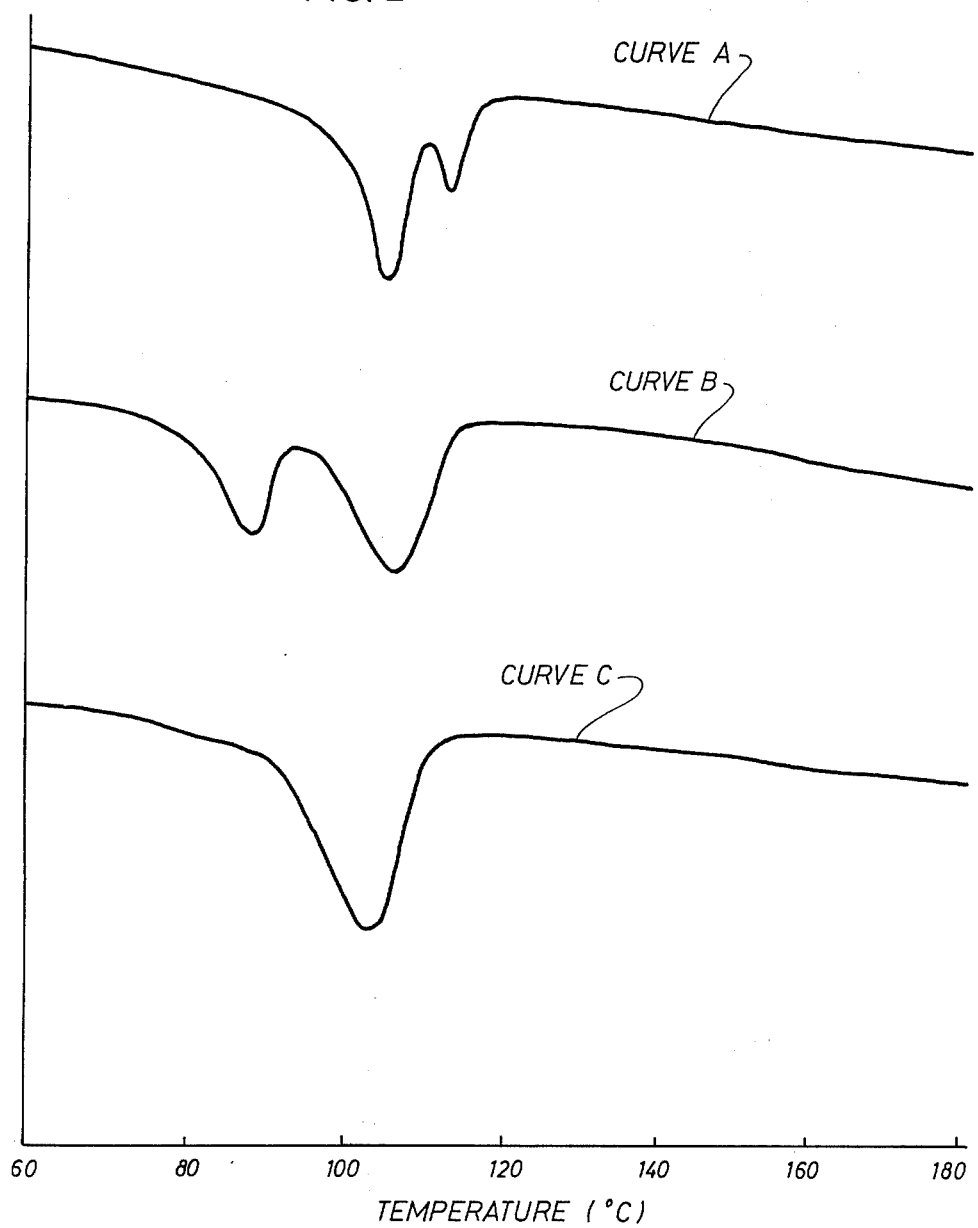
FIG. 2 is a plot of differential scanning calorimeter scans of a butene-1 homopolymer and plasticized butene-1 homopolymer compositions containing, respectively, 20 and 30 weight % of a hydrocarbon plasticizer.

It is known that butene-1 homopolymers exhibit different crystalline modifications; the two modifications of principal interest being identified simply as Modification I and Modification II. Immediately after fabrication, articles fabricated from a butene-1 homopolymer exist principally in the II modification which has poorer mechanical properties than the Modification I. Upon standing at ambient temperature, the fabricated article is transformed to the I modification. This phenomenon causes certain practical problems and it would be desirable to accelerate the rate at which articles fabricated from butene-1 homopolymers transform from the II modification to the I modification. It has been observed that the plasticized compositions of this invention transform from the II modification to the I modification at a faster rate than does unplasticized butene-1 homopolymer. To demonstrate this effect, differential scanning calorimeter (DSC) scans were made of the compositions of Example I, Part A; Example 1, Part B; and the butene-1 homopolymer contained therein. In each case, the samples were melted by heating to a temperature of 180° C., and the DSC scans then were run on the specimens after allowing them to age for 24 hours at ambient temperature. The data are plotted in FIG. 2.

Curve A is the plot for the butene-1 homopolymer. It will be noted that the curve contains two peaks which represent the transitions of the melting of the I modification and the II modification. The left-hand peak as shown in curve A appears at approximately 105° C. and is the transition for the melting of the II modification, whereas the righthand peak which occurs at approximately 112° C. is the transition of the melting of the I modification. Curve A shows that the transition peak for the type II modification is significantly greater than the transition peak for the type I modification.

Curve B is the curve for the composition of Example 1, Part A, which contains 20 weight % plasticizer. It will be noted that both peaks are displaced to the left and are broader than the corresponding peaks of Curve A. The broadening of the two peaks demonstrates that the plasticizer is compatible with the polymer and has broadened the temperature range over which the polymer melts at the two transition peaks. It also is noted that the transition peak for the type I modification is significantly greater than the transition peak for the type II modification.

Curve C is the curve for the composition of Example 1, Part B, which contains 30% plasticizer. It will be noted that the transition peak for the type II modification has substantially disappeared. It also will be noted that the peak for the type I modification has been displaced slightly to the left and has a broader melting point range that appears in either Curve A or Curve B.

It has been observed that the optical properties of film prepared from a plasticized butene-1 polymer composition containing a finely-divided inorganic pigment can be modified by the processing conditions employed. A composition of the invention containing an inorganic pigment such as talc, when blow-extruded into film tends to be somewhat translucent in appearance when the identical composition is extruded under conditions such that the film is biaxially oriented, the film is opaque. A similar effect is noted with other inorganic pigments such as calcium silicate, calcium carbonate, precipitated silicas, and the like.

What is claimed:

1. A plasticized butene-1 polymer composition consisting essentially of a crystalline butene-1 polymer having a hydrocarbon plasticizer uniformly distributed therein; said hydrocarbon plasticizer being a hydrogenated, highly-branched, dimer of an alpha olefin containing about 8–12 carbon atoms, and having a viscosity in the range of about 40 to 6.5 centistokes at 100° F. (38° C.).

2. A composition of claim 1 which contains about 20–100 parts of plasticizer per 100 parts of butene-1 polymer.

3. A composition of claim 1 which contains about 25–50 parts of plasticizer per 100 parts of butene-1 polymer.

4. A composition of claim 1, 2, or 3 in which the plasticizer is a hydrogenated dimer of n-decene-1.

5. A biaxially-oriented film of a composition of claim 1, 2, or 3, said composition also containing an inorganic pigment.

* * * * *